(12) United States Patent
Kobayashi et al.

(10) Patent No.: US 10,642,344 B2
(45) Date of Patent: May 5, 2020

(54) MANIPULATING VIRTUAL OBJECTS WITH SIX DEGREE-OF-FREEDOM CONTROLLERS IN AN AUGMENTED AND/OR VIRTUAL REALITY ENVIRONMENT

(71) Applicant: GOOGLE INC., Mountain View, CA (US)

(72) Inventors: Tony Kobayashi, Berkeley, CA (US); Paul Dubois, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/679,597

(22) Filed: Aug. 17, 2017

(65) Prior Publication Data

US 2018/0059777 A1    Mar. 1, 2018

Related U.S. Application Data

(60) Provisional application No. 62/378,370, filed on Aug. 23, 2016.

(51) Int. Cl.
*G06T 15/00*  (2011.01)
*G06F 3/01*   (2006.01)
(Continued)

(52) U.S. Cl.
CPC .............. *G06F 3/011* (2013.01); *G06F 3/017* (2013.01); *G06F 3/0346* (2013.01);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS 6,184,867 B1    2/2001  Kandogan et al.
2006/0184336 A1  8/2006  Kolen
(Continued)

FOREIGN PATENT DOCUMENTS

EP    2348383 A1    7/2011

OTHER PUBLICATIONS

Shen, Z., etc. A digit alignment device for kinematic analysis of the thumb and index finger, Gait Posture, Jul. 2012. [Online], [Retrieved on Dec. 5, 2019]. Retrieved from the Internet: <URL: https://www.ncbi.nlm.nih.gov/pmc/articles/PMC3597988/> (Year: 2012).*

(Continued)

*Primary Examiner* — Gordon G Liu
(74) *Attorney, Agent, or Firm* — Brake Hughes Bellermann LLP

(57) ABSTRACT

A system for combining six degree of freedom (6DOF) inputs, or positional and orientation inputs, from multiple 6DOF controllers in an augmented reality (AR) environment and/or a virtual reality (VR) environment is provided. In response to the detected movement of multiple controllers, and in particular, rotational movement of the multiple controllers providing user inputs in a virtual reality environment, the detected movements of the multiple controllers may be resolved to a single, common coordinate system to determine intended input to be applied to a selected virtual object in the virtual environment. The ability to resolve these inputs from multiple 6DOF controllers to a common coordinate system may provide a more natural user input mode, thus enhancing the user's experience.

20 Claims, 17 Drawing Sheets

B9

(51) Int. Cl.
    *G06T 19/00*     (2011.01)
    *G06F 3/0484*     (2013.01)
    *G06F 3/0486*     (2013.01)
    *G06F 3/0346*     (2013.01)
    *A63F 13/428*     (2014.01)
    *A63F 13/211*     (2014.01)
    *A63B 22/02*     (2006.01)
    *G09B 9/00*     (2006.01)

(52) U.S. Cl.
    CPC ........ G06F 3/0486 (2013.01); G06F 3/04842 (2013.01); G06T 19/006 (2013.01); *A63B 2022/0271* (2013.01); *A63F 13/211* (2014.09); *A63F 13/428* (2014.09); *G06F 2203/012* (2013.01); *G09B 9/00* (2013.01)

(58) Field of Classification Search
    USPC ........................................................ 345/419
    See application file for complete search history.

(56) References Cited

U.S. PATENT DOCUMENTS

| | | | |
|---|---|---|---|
| 2010/0013863 A1 | 1/2010 | Harris | |
| 2010/0113153 A1* | 5/2010 | Yen | A63F 13/06 463/37 |
| 2011/0195782 A1* | 8/2011 | Mao | G06F 3/0317 463/37 |
| 2013/0328762 A1* | 12/2013 | McCulloch | G02B 27/017 345/156 |
| 2016/0048994 A1* | 2/2016 | Powers, III | A63F 13/06 345/474 |
| 2016/0140763 A1* | 5/2016 | Seichter | G06F 3/013 345/633 |
| 2016/0239080 A1* | 8/2016 | Marcolina | G06F 3/011 |
| 2017/0262045 A1* | 9/2017 | Rouvinez | G06T 19/006 |
| 2017/0345219 A1* | 11/2017 | Holz | G06T 19/006 |
| 2017/0357332 A1* | 12/2017 | Balan | G02B 27/0093 |
| 2017/0357334 A1* | 12/2017 | Balan | H04N 13/204 |
| 2017/0358139 A1* | 12/2017 | Balan | G02B 27/0172 |
| 2018/0275781 A1* | 9/2018 | Gribetz | G06F 3/03545 |

OTHER PUBLICATIONS

International Search Report and Written Opinion received for PCT Patent Application No. PCT/US2017/047600, dated Nov. 7, 2017, 11 pages.

\* cited by examiner

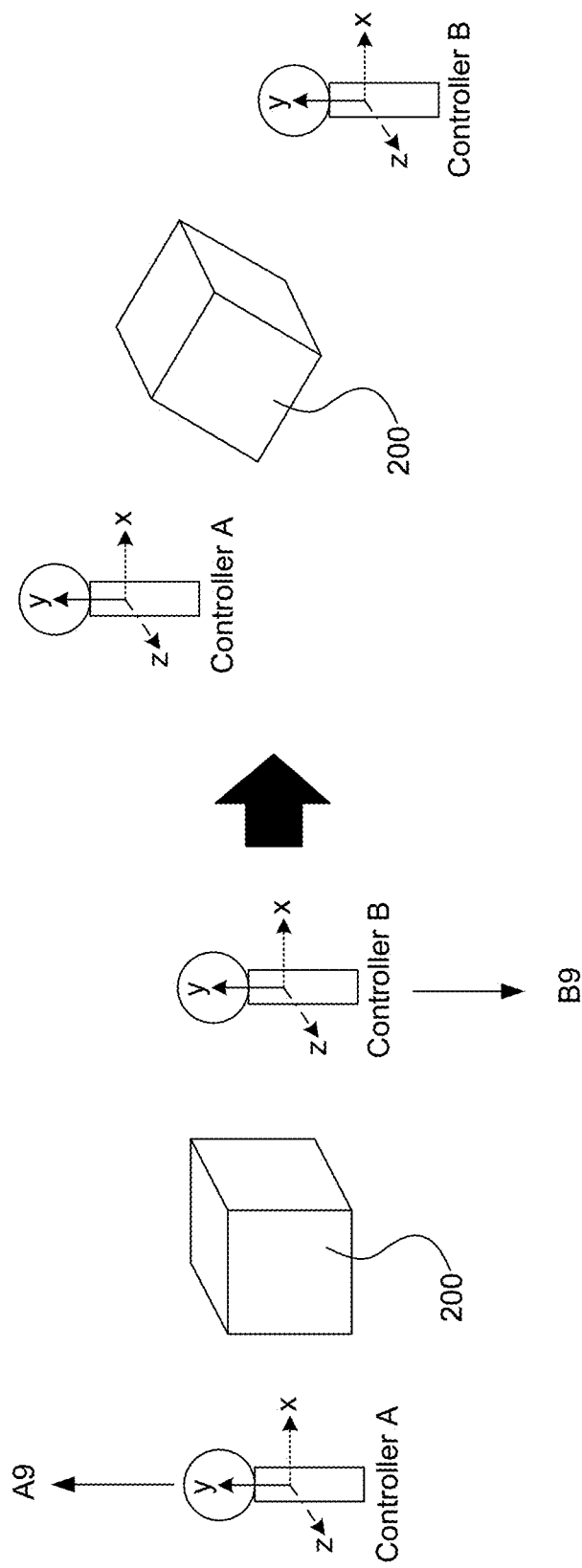

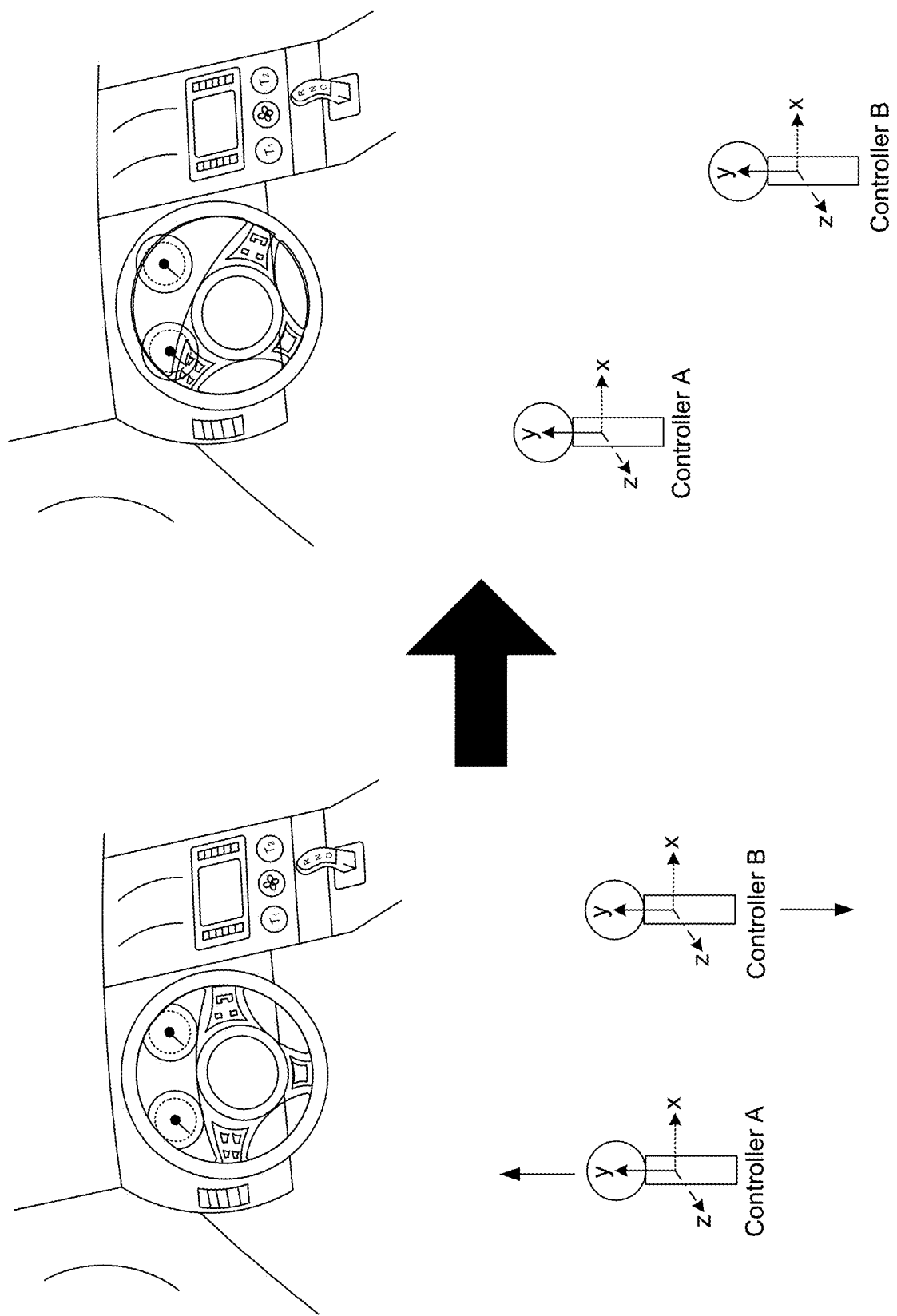

MANIPULATING VIRTUAL OBJECTS WITH SIX DEGREE-OF-FREEDOM CONTROLLERS IN AN AUGMENTED AND/OR VIRTUAL REALITY ENVIRONMENT

CROSS REFERENCE TO RELATED APPLICATION

This application is a Non-Provisional of, and claims priority to, U.S. Provisional Application No. 62/378,389, filed on Aug. 23, 2016, the disclosure of which is incorporated by reference herein in its entirety.

FIELD

This document relates, generally, to the processing of inputs in an augmented reality and/or a virtual reality environment.

BACKGROUND

An augmented reality (AR) and/or a virtual reality (VR) system may generate a three-dimensional (3D) immersive environment. A user may experience the augmented and/or virtual reality environment through interaction with various electronic devices, such as, for example, a helmet or other head mounted device including a display, glasses or goggles that a user looks through when viewing a display device, external handheld devices that include sensors, gloves fitted with sensors, and other such electronic devices. Once immersed in the augmented and/or virtual reality environment, the user may interact in the virtual environment, with virtual objects, elements, features and the like in the virtual environment, in different ways for selection and/or manipulation of the virtual objects in the virtual environment. For example, the user may generate a desired effect in the virtual environment through manipulation of one or more external electronic devices, physical movement and/or gestures, directional head and/or eye gaze, and the like to interact with, personalize and control the virtual environment.

SUMMARY

In one aspect, a method may include generating a three-dimensional (3D) virtual environment; tracking a six-degree-of-freedom (6DOF) position and orientation of a first controller in a physical environment; tracking a 6DOF position and orientation of a second controller in the physical environment; detecting a selection of a virtual object displayed in the virtual environment; detecting an input targeted for the selected virtual object based on a detected movement of the first controller in the physical environment with respect to a first coordinate system and a detected movement of the second controller in the physical environment with respect to a second coordinate system; resolving the detected movement of the first controller with respect to the first coordinate system and the detected movement of the second controller with respect to the second coordinate system to a command movement with respect to a common coordinate system; and manipulating the selected virtual object in response to the command move.

In another aspect, a method may include detecting a selection of a virtual object displayed in a virtual environment; detecting an input targeted for the selected virtual object displayed in the virtual environment in response to a detected movement of a first controller with respect to a first coordinate system, and a detected movement of a second controller with respect to a second coordinate system, the first controller and the second controller operating in a physical environment; resolving the detected movement of the first controller and the detected movement of the second controller to a command movement with respect to a common coordinate system; and rotating the selected virtual object in the virtual environment in response to the command movement.

In another aspect, a computer program product may be embodied on a non-transitory computer readable medium, the computer readable medium having stored thereon a sequence of instructions. The instructions, when executed by a processor, may cause the processor to execute a method, the method including generating a three-dimensional (3D) virtual environment; tracking a six-degree-of-freedom (6DOF) position and orientation of a first controller in a physical environment; tracking a 6DOF position and orientation of a second controller in the physical environment; detecting a selection of a virtual object displayed in the virtual environment; detecting an input targeted for the selected virtual object based on a detected movement of the first controller in the physical environment with respect to a first coordinate system and a detected movement of the second controller in the physical environment with respect to a second coordinate system; resolving the detected movement of the first controller with respect to the first coordinate system and the detected movement of the second controller with respect to the second coordinate system to a command movement with respect to a common coordinate system; and manipulating the selected virtual object in response to the command movement.

The details of one or more implementations are set forth in the accompanying drawings and the description below. Other features will be apparent from the description and drawings, and from the claims.

BRIEF DESCRIPTION OF THE DRAWINGS

FIGS. 3-9 illustrate example movements of multiple 6DOF controllers and corresponding movements of virtual objects in an augmented and/or virtual reality environment, in accordance with implementations as described herein.

FIGS. 10A-10D illustrate example implementations of use of multiple 6DOF controllers in manipulation of a selected virtual object in an augmented reality and/or virtual reality environment, in accordance with implementations described herein.

DETAILED DESCRIPTION

A user immersed in a virtual environment wearing, for example, a head mounted display (HMD) device, may explore the virtual environment, and may interact with virtual objects, elements, features and the like the virtual environment through various different types of inputs. These inputs may include, for example, manipulation of an electronic device separate from the HMD and/or manipulation of the HMD itself, and/or eye directional gaze, and/or head movement and/or hand/arm gestures, and the like. The user may manipulate one or more handheld electronic device(s), or controller(s), operably coupled to, or paired with the HMD, to cause a desired action in the virtual environment. A user may manipulate a controller in a variety of different ways, such as, for example touch inputs to a touch surface of the controller, manipulation of input buttons and/or switches on the controller, physical movement of the controller itself, and the like, to provide input to be implemented in the virtual environment. For example, in some implementations, the controller may be manipulated to adjust a visual size and/or appearance and/or position of virtual content displayed to the user in the virtual environment. This capability may provide flexibility and convenience in providing user input, and may enhance the user's virtual experience.

In a system and method, in accordance with implementations described herein, movement of multiple controllers, and in particular, rotation of multiple controllers providing user inputs in a virtual reality environment, may be resolved to a single coordinate system to determine the intended interaction with respect to a particular virtual object.

Hereinafter, simply for ease of discussion and illustration, the one or more handheld electronic devices to be used for interaction in an augmented and/or virtual reality environment will be referred to as controllers. However, the principles described herein may be applied to other types of external electronic devices which may be used to interact with virtual objects, virtual features and the like presented to the user for interaction in an augmented and/or virtual reality environment.

Figure 1:
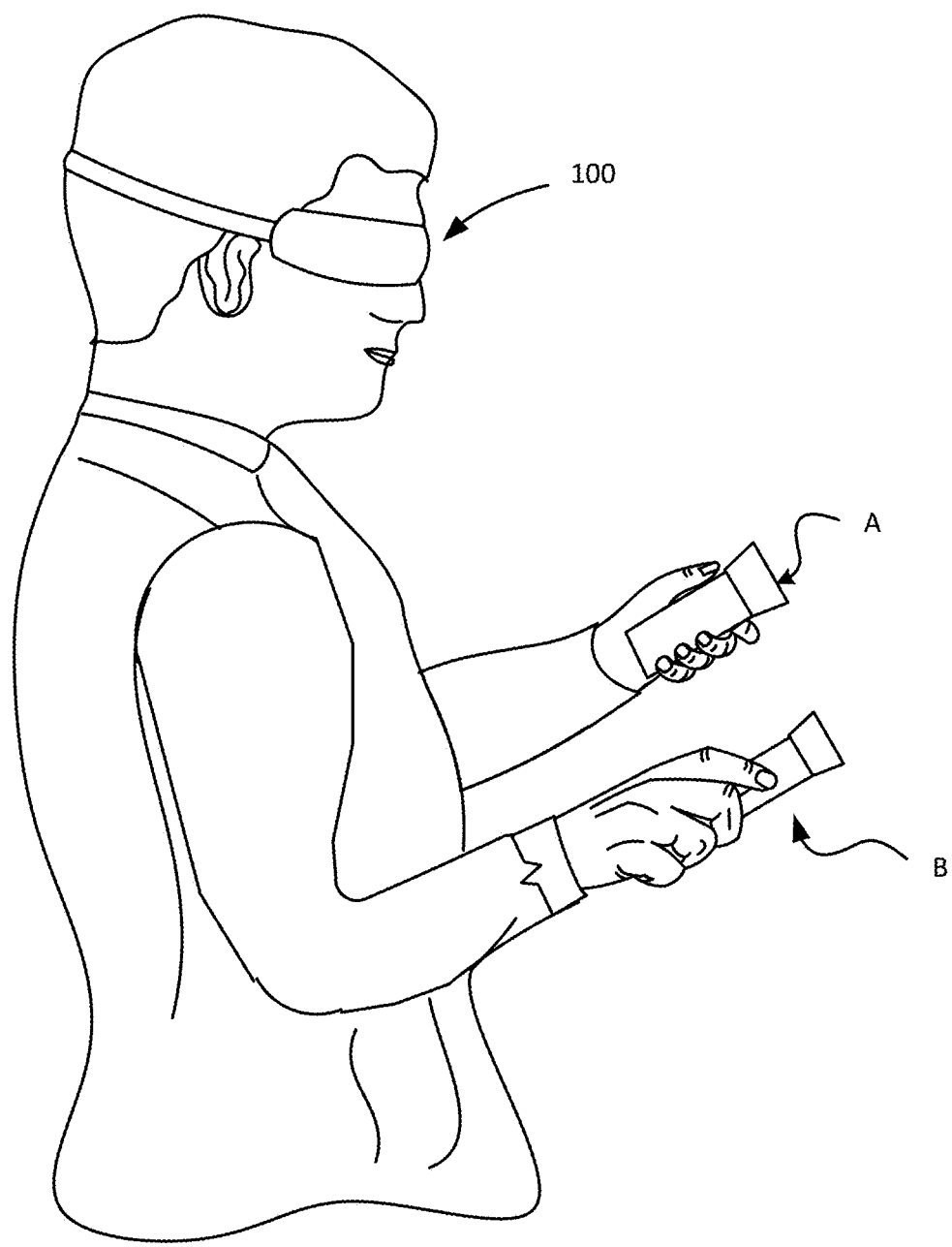
FIG. 1 is an example implementation of a virtual reality system including a head mounted display (HMD) device and handheld electronic device(s), in accordance with implementations as described herein.

In the example implementation shown in FIG. 1, a user wearing an HMD 100 is holding a first portable handheld electronic device A, or a first controller A, in one hand, and a second portable handheld electronic device B, or second controller B, in the other hand. One, or both of the controllers A, B may be, for example, a gyromouse, a smartphone, a controller configured for operation with a particular system, or other type of controller that may be paired with, and communicate with, the HMD 100 for interaction in the immersive virtual environment generated by the HMD 100. In some implementations, a 6DOF position and orientation of the controllers A, B may be tracked based on various sensors included in the controllers A, B. These sensors may include, for example, an inertial measurement unit including, for example, an accelerometer, a gyroscope, a magnetometer, and the like as in a gyroscope, or a smartphone adapted in this manner. In some implementations, a 6DOF position and orientation of the controllers A, B may be tracked based on a position of the respective controller A, B detected by other sensors in the system. These other sensors may include, for example image sensors included on the HMD 100, together with orientation sensors included in the controllers A, B. The controllers A, B may be operably coupled with, or paired with the HMD 100 via, for example, a wired connection, a wireless connection such as, for example, a wifi or Bluetooth connection, and the like, to provide for the exchange of data and communication between the controllers A, B and the HMD 200. This connection between the HMD and the controllers A, B may allow the user to interact in the virtual environment generated by the HMD 200 through manipulation of one or both of the controllers A, B. That is, a manipulation of one or both of the controllers A, B, such as, for example, a physical movement and/or an input received on a touch surface of the controller A, B, or a virtual ray or beam emitted by the controller A, B directed, by the user, at an virtual object in the virtual environment, may be translated into a corresponding interaction, or movement, in the virtual environment.

As noted above, in some implementations, one or both of the controllers A, B may be equipped with gyromouse type capabilities, and may be operable in free space to, for example, select, manipulate and in other manners interact with virtual objects in the virtual environment. Use of one or more controller(s) A, B including gyromouse capabilities may essentially allow for relatively accurate tracking of a 6DOF location (position and orientation) in the three dimensional (3D) space, or real world environment, in which the system is operating.

For example, the controllers A, B may include a gyroscope that generates a signal indicating angular movement of the controllers A, B. The detected angular movement of the controllers A, B may be translated into directional movement in the virtual environment. In some implementations, the controllers A, B may also include an accelerometer that generates a signal indicating acceleration of the controller A, B, for example, acceleration in a direction corresponding to the directional signal generated by the gyroscope. In some implementations, the controllers A, B may also include a magnetometer that generates a signal indicating relative position of the controller A, B in the real world environment based on the strength and/or direction of a detected magnetic field. The detected three dimensional position of the controllers A, B in the real world environment, together with orientation information related to the controllers A, B provided by the gyroscope and/or accelerometer and/or magnetometer, may provide for 6DOF tracking of each of the controllers A, B. This may allow user manipulation of the controllers A, B to be translated into a targeted, or intended interaction in the virtual environment and/or an action to be directed to a selected virtual object in the virtual environment.

In some implementations, one or both of the controllers A, B may include manipulation devices configured to receive various different types of user inputs. For example, in some implementations, the controllers A, B may include a touch surface(s) configured to receive, for example, a touch input, a touch and drag input, a pinch and zoom input and the like. The controllers A, B may also include other manipulation devices, such as, for example, one or more buttons, one or more toggle switches, one or more joysticks, and the like, configured to receive user inputs.

Controllers A, B equipped in this manner may receive user inputs in a variety of different input modes to be translated into corresponding interactions in the virtual environment. These user input modes may include, for example, a physical movement or gesture of the controllers A, B based on position, orientation and directional movement detected and tracked by the sensors included in the controllers A, B. These user input modes may also include a touch input (including touch and drag, pinch and zoom and the like) detected on the touch surface of the controllers A, B, a selection received at one of the manipulation devices of the controllers A, B, and other such inputs. In some implementations, the controllers A, B may receive a user command including a combination of these user input modes, or a sequential application of these user input modes.

When interacting in a virtual environment using multiple 6DOF controllers, such as, for example, the first controller A and the second controller B as described above, a way to translate, uniformly scale, and rotate virtual objects using two 6DOF controllers may allow the user to interact with virtual objects in a natural manner, with the first controller A in one hand, and the second controller B in the other hand. In a system and method, in accordance with implementations described herein, a single, consistent, common coordinate system may be defined for multiple 6DOF controllers operating in the same virtual environment (and the same real world environment), with each of the controllers moving independently, within their own respective coordinate systems.

Figure 7:
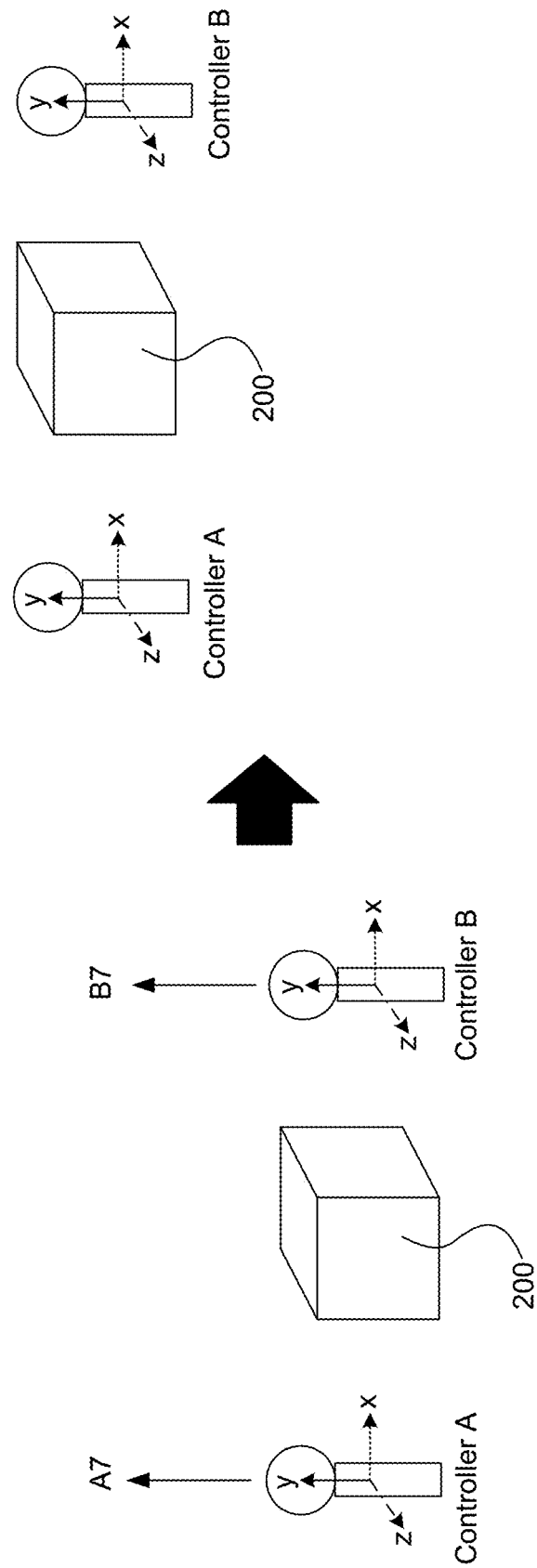
Figure 8:
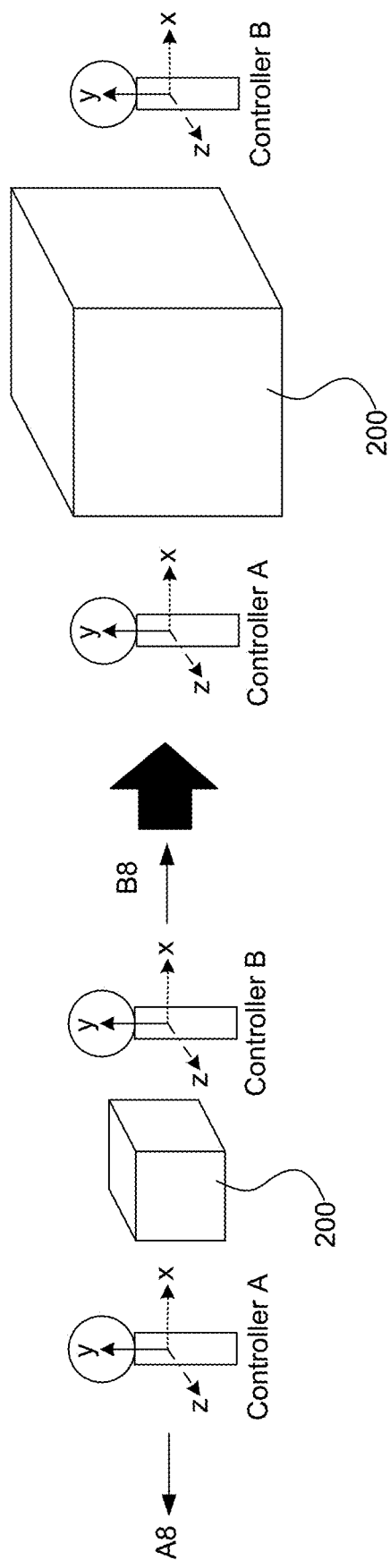

As described above, virtual reality 6DOF controllers, such as the first and second controllers A, B described above, may provide position and orientation information. A single controller operated by the user for interaction in the virtual environment may be manipulated to directly control the position and orientation of a virtual object in the virtual environment. In a similar way, position and orientation information from multiple controllers, for example, the first and second controllers A, B described above, may be used to control a position of a virtual object in the virtual environment, for example, based on average positions of the first and second controllers A, B, as shown in FIG. 7. Similarly, position and orientation information from multiple controllers, such as the first and second controllers A, B described above, may be used to control a scale of the virtual object, for example, based on a known starting position of the first and second controllers A, B and detected changes in position of the first and second controllers A, B, as shown in FIG. 8. In a system and method, in accordance with implementations described herein, position and orientation information from multiple controllers, such as the first and second controllers A, B described above, may be used to control a rotation of the virtual object, as shown in FIG. 9.

Determining and controlling orientation of a virtual object in the virtual environment, for example, in response to rotational movement of the first and second controllers A, B, when operating with multiple controllers A, B may pose additional challenges, or may pose an over-constrained problem. That is, the position and movement of the first controller A may imply a first targeted, or intended, orientation for the virtual object, and the position and movement of the second controller B may imply a second targeted, or intended orientation for the virtual object that is different from the first targeted, or intended orientation implied by the first controller A. In some implementations, the two separate coordinate systems, in which the two separate controllers A, B respectively operate, may be resolved into a single, common coordinate system. An algorithm may resolve the position and movement, in particular, rotation, of the first controller A and the position and movement, in particular, rotation, of the second controller B, to this common coordinate system. This resolution provided by the algorithm may determine an input targeted, or intended, by the movement of the first and second controllers A, B to affect, for example, a change in orientation of the selected virtual object.

Figure 2:
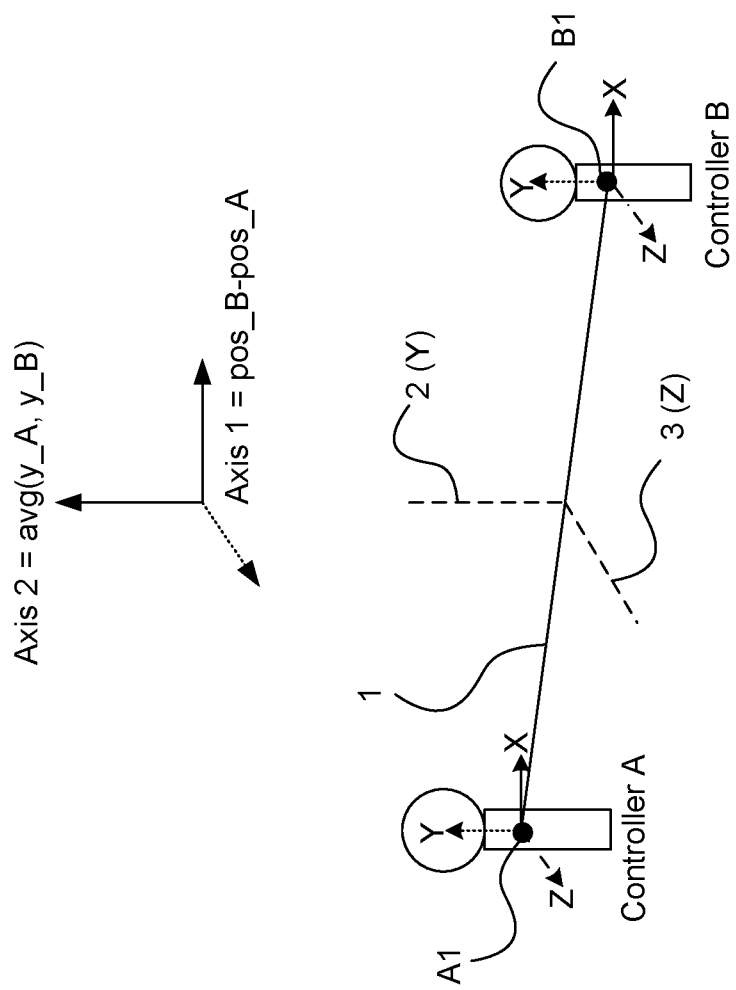
FIG. 2 illustrates respective coordinate systems of multiple six-degree-of-freedom (6DOF) controllers operating in an augmented and/or virtual reality environment, in accordance with implementations as described herein.

In this common coordinate system, a first axis 1 of the common coordinate system may be defined by a vector extending between a position of the first controller A and a position of the second controller B at the same point in time. For example, the first axis 1 may be defined by a vector extending between a pre-defined central portion A1 of the first controller A and a pre-defined central portion B1 of the second controller B, as shown in FIG. 2.

A second axis 2 of the common coordinate system may be defined by an average of a direction of the first controller A and a direction of the second controller B at the same point in time. The algorithm may select this direction dynamically, at sequential points in time, to be a direction of movement of the controllers A, B that is most orthogonal to the first axis 1, so that the central coordinate system may remain as stable as possible. For example, the second axis 2 may be dynamically selected to be the X axis, or the Y axis, or the Z axis of the first controller A, depending on which of the X, Y or Z axis is most orthogonal to the first axis 1. In some implementations, the most orthogonal axis, for example, the most orthogonal of the X axis, the Y axis or the Z axis of the first controller A in this example, may be the axis that intersects the first axis 1 at an angle closest to a right angle, or closest to 90 degrees. In the example shown in FIG. 2, the first controller A and the second controller B are facing in essentially similar directions, interacting with, for example, virtual objects essentially in front of the user. In the example shown in FIG. 2, the controllers A and B are being held by the user essentially straight and essentially parallel, so that the first axis 1 extends between the central portion A1 of the first controller A and the central portion B1 of the second controller B. In this example, based on the relative positions of the first and second controllers A, B and the first axis 1, the algorithm would select either the Y axis or the Z axis as the second axis 2, as one of these axes would be the most orthogonal to the first axis 1.

The third axis 3 of the common coordinate system may be the cross product of the first axis 1 and the second axis 2. In other words, the third axis 3 may represent a third vector which is the cross product of the vector represented by the first axis 1 and the vector represented by the second axis 2.

Figure 3:
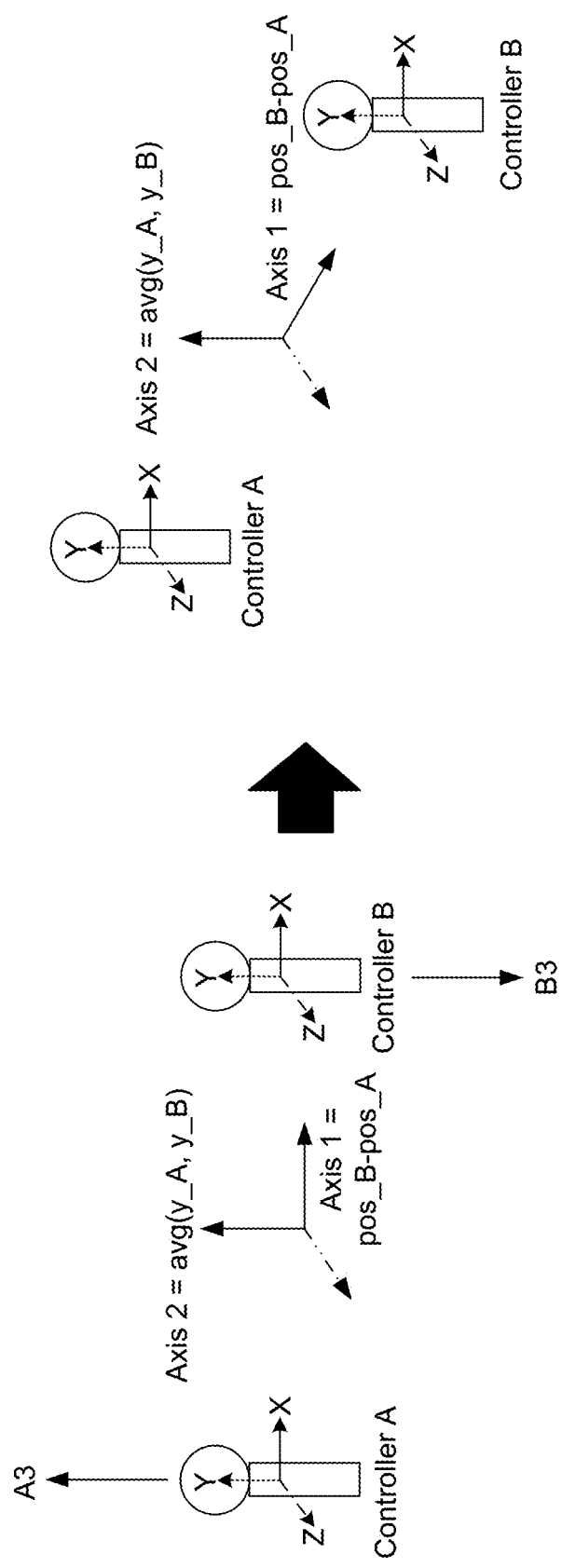

FIG. 3 illustrates an example in which the user may move the first controller A and the second controller B to cause rotation of a virtual object, for example, clockwise or counterclockwise rotation of a virtual object such as, for example, a virtual steering wheel, a virtual dial and the like. The movement of the first and second controllers A and B and resulting rotation of the virtual object, may be displayed for example, on a display of the HMD 100 worn by the user. In the example shown in FIG. 3, the first controller A and the second controller B are oriented substantially vertically, and facing in essentially similar directions just prior to initiation of movement. Movement of the first controller A in an upward direction as shown by the arrow A3, and a movement of the second controller B in a downward direction as shown by the arrow B3, may result in a clockwise rotation of the virtual object. An amount of rotation of the virtual object may be determined by the resolution of the movement of the first and second controllers A, B by the algorithm to the common coordinate system as described above.

Figure 4:
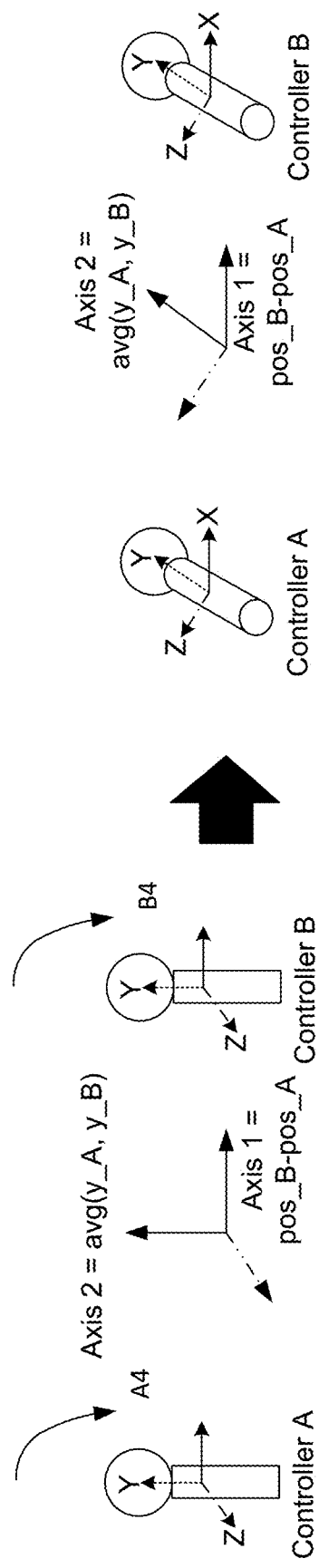

FIG. 4 illustrates an example in which the user may move the first controller A and the second controller B so as to cause rotation of a virtual object, for example, from an upright, substantially vertical position, to a prone or substantially horizontal position. In the example shown in FIG. 4, the first controller A and the second controller B are oriented substantially vertically, and facing in essentially similar directions just prior to initiation of movement. Rotational movement of the first controller A about the X axis, as shown by the arrow A4, and a rotational movement of the second controller B about the X axis, as shown by the arrow B4, may result in a corresponding rotational movement of the virtual object. An amount of rotation of the virtual object may be determined by the resolution of the rotational movement of the first and second controllers A, B by the algorithm to the common coordinate system as described above.

Figure 5:
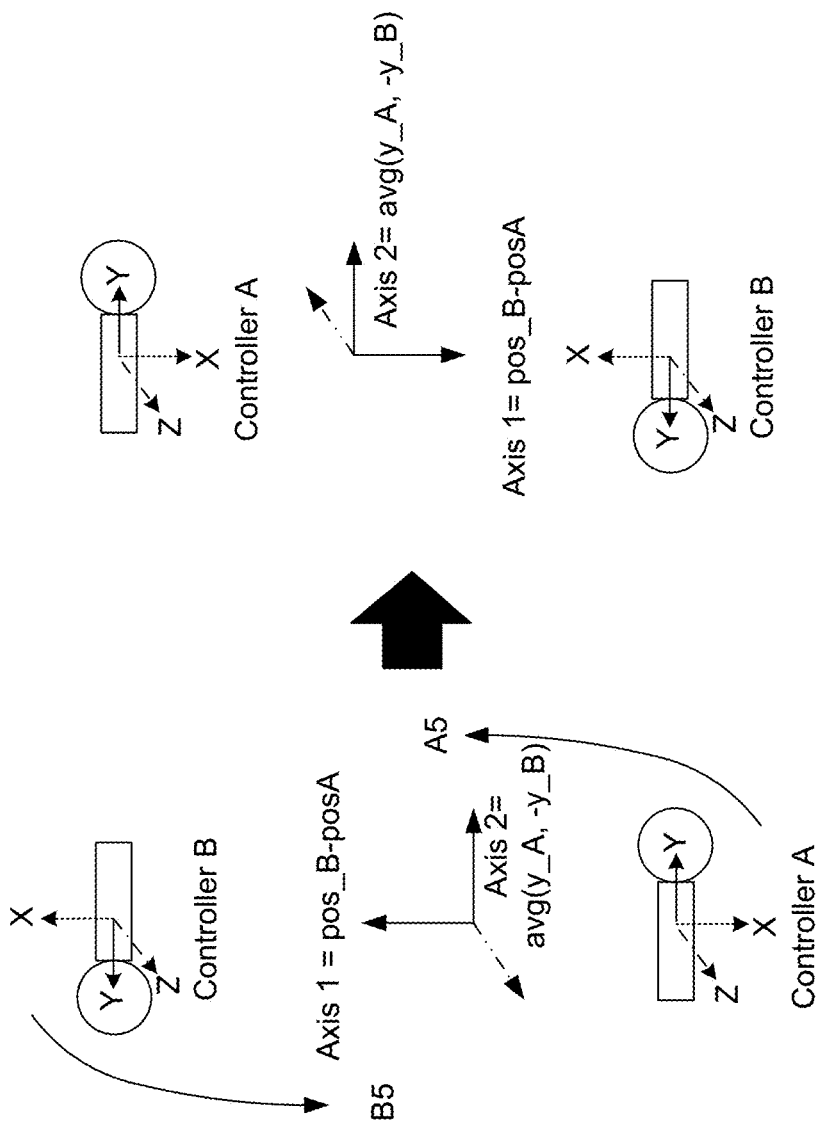

FIG. 5 illustrates an example in which the first controller A and the second controller B are oriented in different directions prior to initiation of rotational movement. In the example shown in FIG. 5, the first controller A is oriented in a first direction (i.e., to the right in FIG. 5), and the second controller B is oriented in a second direction (i.e., to the left in FIG. 5). In this example, the first and second controllers are oriented in substantially opposite directions; however the principles to be described may be applied with the controllers A, B facing different directions that are not necessarily directly opposite directions. A movement of the first controller A in an upward direction, as shown by the arrow A5, and a movement of the second controller B in a downward direction, as shown by the arrow B5, without changing a directional orientation of either of the controllers A, B, may result in a flipping type movement of the virtual object. An amount of the flipping movement of the virtual object may be determined by the resolution of the rotational movement of the first and second controllers A, B by the algorithm to the common coordinate system as described above.

Figure 6:
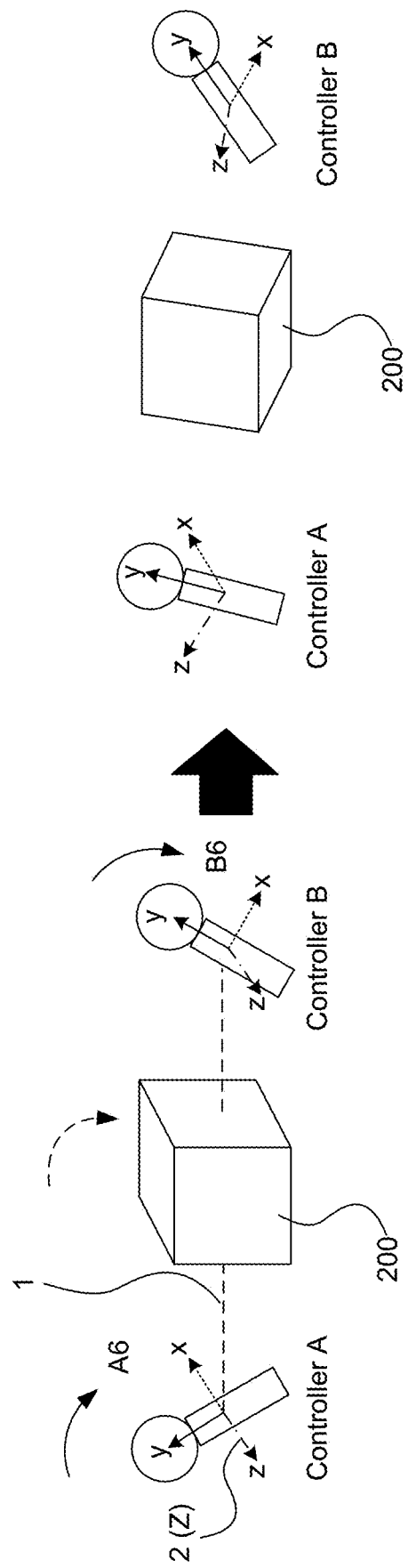

FIG. 6 illustrates an example in which a virtual object 200 is selected by the user for interaction using the first and second controllers A, B. In this example, the first controller A is oriented in a first direction, and the second controller B is oriented in a second direction prior to initiation of movement. A rotational movement of the first controller A in a clockwise direction, as shown by the arrow A6, and a rotational movement of the second controller B in a clockwise direction, as shown by the arrow B6, may result in a rotational movement of the virtual object 200. The amount of rotational movement of the virtual object 200 in response to the rotation of the first and second controllers A, B may be determined by the resolution, by the algorithm, of the detected rotational movement of the first and second controllers A, B within their respective coordinate systems, to the common coordinate system, as described above.

That is, in establishing the common coordinate system for the first controller A and the second controller B, the first axis 1 of the common coordinate system may defined by a line extending between the central portion A1 of the first controller A and the central portion B1 of the second controller B. The second axis may then be dynamically assigned by the algorithm, as the first controller A and the second controller B each move, independently. The algorithm may select the direction of the second axis 2 dynamically, at sequential points in time, to correspond to the direction of movement of the controllers A, B that is most orthogonal to the first axis 1, so that the central coordinate system may remain as stable as possible. In the example shown in FIG. 6, the second axis 2 at the point in time represented may be, for example, the Z axis of the first controller A. The third axis of the common coordinate system may be the cross product of the first axis 1 and the second axis 2, for each point in time.

As the first controller A and the second controller B each move, or rotate, independently, the movement of the controllers A, B may be dynamically detected and tracked by the system. The dynamically detected movements of the controllers A, B may be resolved to a single movement with respect to the common coordinate system at each point in time, and that single movement may be applied to the selected virtual object 200. The movement of the selected virtual object 200 may be displayed to the user on a display of the HMD 100 worn by the user.

As noted above, in some implementations, the two separate coordinate systems in which the first controller A and the second controller B respectively operate may be resolved into a single, common coordinate system by an algorithm that dynamically averages the motions of the first and second controllers A, B. For example, an amount of translation to be applied to the virtual object 200 based on the detected movement of the first and second controllers A, B may be determined based on an average change in the positions of the controllers A, B. Similarly, a change in scale to be applied to the virtual object 200 based on the detected movement of the first and second controllers A, B, may be determined based on a change in distance between the controllers A, B. A rotational input to be applied to the virtual object 200 based on the detected movement of the first and second controllers A, B may be determined based on a change in vector between the controllers A, B. Thus, rotation of the virtual object may be primarily defined by the rotation of each of the first and second controllers A, B with respect to the common coordinate system. In determining the targeted, or intended action to be taken on the selected virtual object 200 based on the detected movement of the first and second controllers A, B, these actions may be implemented individually (for example, in a sequential manner), and/or may be implemented simultaneously.

As shown in FIG. 7, an amount of translation of a virtual object 200 in response to movement of multiple controllers, such as the first and second controllers A, B, may be determined based on an average change in the position of the controllers A, B. In the example shown in FIG. 7, the first controller A and the second controller B are oriented substantially vertically, and facing in essentially similar directions just prior to initiation of movement. Movement of the first controller A in an upward direction as shown by the arrow A7, and a movement of the second controller B in an upward direction as shown by the arrow B7, may result in a corresponding upward movement, or upward translation, of the virtual object 200. The amount of upward movement of the virtual object 200 in response to the upward movement of the first and second controllers A, B may be based on an average of the upward movement of the first controller A and the upward movement of the second controller B. The amount of movement of the first and second controllers A, B may be determined, and dynamically updated, based on a known position of the first controller A and the second controller B just prior to initiation of movement, and a known position of the first controller A and the second controller B as the 6DOF movement of the first and second controllers A, B is tracked as described above.

As shown in FIG. 8, an amount of scaling of the virtual object 200 in response to movement of multiple controllers, such as the first and second controllers A, B, may be determined based on an average change in the distance between the controllers A, B. In the example shown in FIG. 8, the first controller A and the second controller B are oriented substantially vertically, and facing in essentially similar directions just prior to initiation of movement.

Movement of the first controller A in a first direction as shown by the arrow A8, and movement of the second controller B in a second direction, that is different from the first direction, for example, opposite the first direction, as shown by the arrow B8, may result in a corresponding scaling, for example, uniform scaling, of the virtual object 200. The amount of scaling of the virtual object 200 in response to the movement of the first controller A in the first direction and the second controller B in the second direction may be based on the detected change in distance between the first and second controllers A, B. For example, the distance between the first and second controllers A, B may be determined, and dynamically updated, based on a known position of the first controller A and the second controller B just prior to initiation of movement, and a known position of the first controller A and the second controller B as the 6DOF movement of the first and second controllers A, B is tracked as described above. In the example shown in FIG. 8, the first and second controllers A, B are oriented in substantially opposite directions; however the principles described with respect to FIG. 8 may be applied with the first and second controllers A, B facing different directions that are not necessarily directly opposite directions.

As shown in FIG. 9, an amount of rotation of the virtual object 200 in response to movement of multiple controllers, such as the first and second controllers A, B, may be determined based a change in vector between the first controller A and the second controller B. As noted above, the determination of targeted, or intended translation of the virtual object 200, and/or targeted, or intended scale of the selected virtual object 200, based on the detected movement of the first controller A and detected movement of the second controller B, may be a relatively straightforward application of these principles at sequential points in time during operation of the first and second controllers A, B for interaction in the virtual environment. However, the determination of targeted, or intended rotational movement of the selected virtual object 200 based on the detected movement of the first controller A and detected movement of the second controller B may pose additional challenges. For example, in some implementations, determination of targeted, or intended rotational movement of the selected virtual object 200 based on the detected movement of the first controller A and detected movement of the second controller B may include implementation of a quaternion, based on the previous and current axis between the two vectors.

In the example shown in FIG. 9, the first controller A and the second controller B are oriented substantially vertically, and facing in essentially similar directions just prior to initiation of movement. Movement of the first controller A in a first direction, for example, the upward direction, as shown by the arrow A9, and movement of the second controller B in a second direction, for example, the downward direction, as shown by the arrow B9 may cause rotation of the virtual object 200 in the clockwise direction. The amount of rotation of the virtual object 200, based on the detected movement of the first and second controllers A, B, may be determined through implementation of a quaternion based on a previous vector axis of the controllers A, B and a current vector axis of the controllers A, B. In constraining the rotation of each controller A, B to the resulting axis, an algorithm may be applied to calculate an adjustment quaternion from the previous quaternion to the current quaternion. The imaginary part of the log of the adjustment quaternion may then be obtained, yielding the axis of rotation for the adjustment. The new adjustment may be constrained by taking the exponential dot product between the previous axis and the adjustment axis.

As noted above, the determination of the targeted, or intended rotational movement of the selected virtual object 200 based on the detected movement of the first controller A and detected movement of the second controller B may include implementation of a quaternion, based on the previous and current axis between the two vectors, with the rotation of the virtual object based on orientation of the first and second controllers A, B being achieved by constraining the rotation of each controller A, B. The constraint of the rotation of each controller A, B may be achieved by calculating an adjustment quaternion that goes from the previous quaternion to the current quaternion, and then obtaining the imaginary part of the log of the adjustment quaternion, which defines the axis of rotation for the adjustment. The system may then constrain the new adjustment by taking the exponential dot product between the specified axis and the adjustment axis.

Figure 10A:
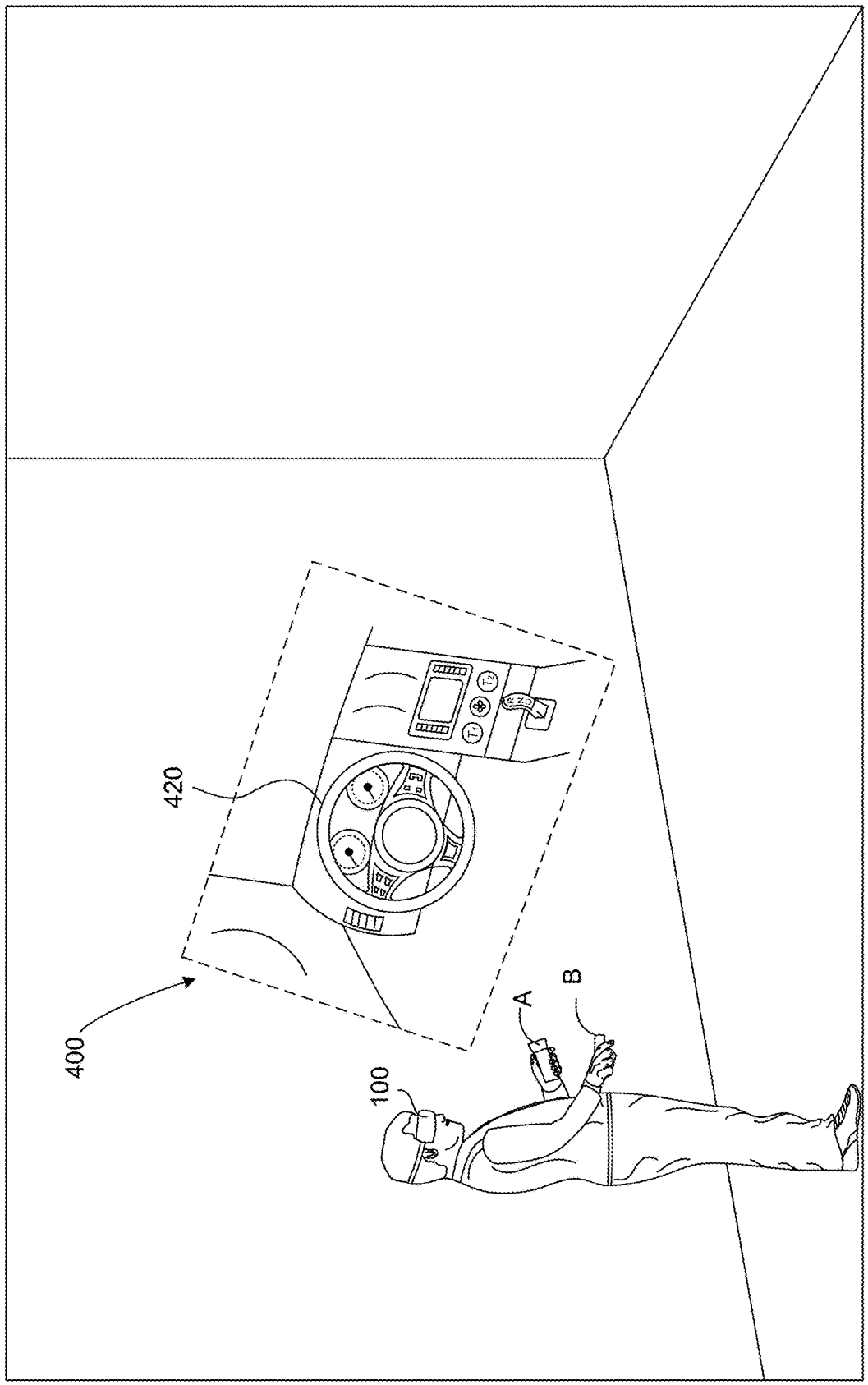

FIG. 10A is a third person view of a user in a physical space, wearing an HMD 100 and holding the first controller A in one hand and the second controller B in the other hand, while experiencing a virtual environment generated by the HMD 100. In the example shown in FIG. 10A, an example of a virtual scene 400 that may be viewed by the user when experiencing the virtual environment while wearing the HMD 100 is represented as an inset, for ease of discussion and illustration. The user may choose to select one of the virtual objects displayed in the virtual scene 400 for interaction and/or manipulation and the like in numerous different manners. In the example shown in FIG. 10B, the user has chosen to interact with a virtual steering wheel 420, by, for example, making virtual contact with the virtual steering wheel 420 using, for example, one or both of the controllers A, B, directing a virtual beam from one or both of the controllers A, B at the virtual steering wheel 420, and the like. Once the virtual object, in this example, the virtual steering wheel 420, has been selected by the user, the user may interact with the virtual steering wheel 420 using the first controller A and/or the second controller B through, for example, movement of the first and/or second controller A, B, actuation of manipulation devices on one or both of the controllers A, B and the like.

For example, in response to movement of the first controller A and the second controller B as shown in FIG. 3 and/or FIG. 9, the virtual steering wheel 420 may be rotated clockwise, as shown in FIG. 10C. An amount of rotation of the virtual steering wheel 420 may be determined based on the detected movement of the first controller A, the detected movement of the second controller B, and the resolution of the detected movements of the first controller A and the second controller B to a common coordinate system, as described in detail above with respect to FIGS. 3 and 9. This rotation of the virtual steering wheel 420 may be displayed to the user on a display of the HMD 100 worn by the user.

Figure 10B:
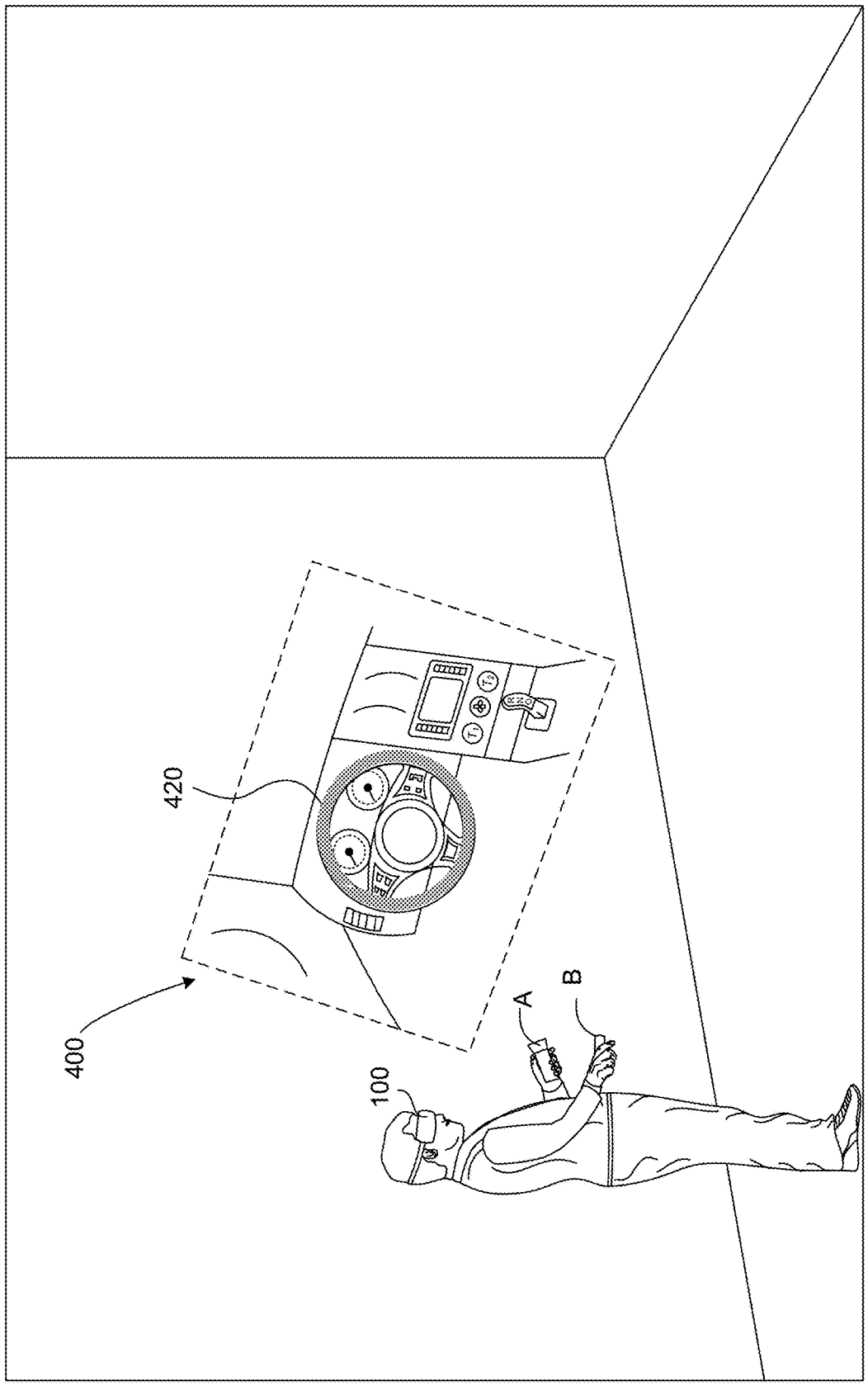

FIGS. 10A-10C illustrate just one example of the rotation of a virtual object 420 in response to rotational movement of the first controller A and the second controller B as described above. In addition to translation of virtual objects, and scaling of virtual objects, numerous other movements of selected virtual objects may be effected in response to detected movement, and in particular, rotational movement, of multiple controllers such as the first controller A and the second controller B described above. Such movements may include, for example, rotation about one or more of the axes X, Y and/or Z, alone or in combination, and may also be combined with translation and scaling. These movements of the virtual object may be effected in the virtual environment sequentially and/or simultaneously, in response to corresponding movements of the first and/or second controllers A, B.

As described above, in some implementations, the position and orientation of the first controller A and the second controller B may be dynamically tracked, and the movements of the first and second controllers A, B may be dynamically resolved to the common coordinate system, so that inputs may be dynamically applied in the virtual environment. Thus, sequential movements, and combinations of movements, of the first and second controllers A, B may be dynamically resolved to the common coordinate system. This may allow an essentially infinite collection of motions to be detected, tracked, and resolved to the common coordinate system, and to be reflected as inputs in the virtual environment. For example, this system and method may be applied in a virtual environment in which a user may select, for example, a drawing implement or a painting implement for drawing, painting and the like.

Figure 10D:
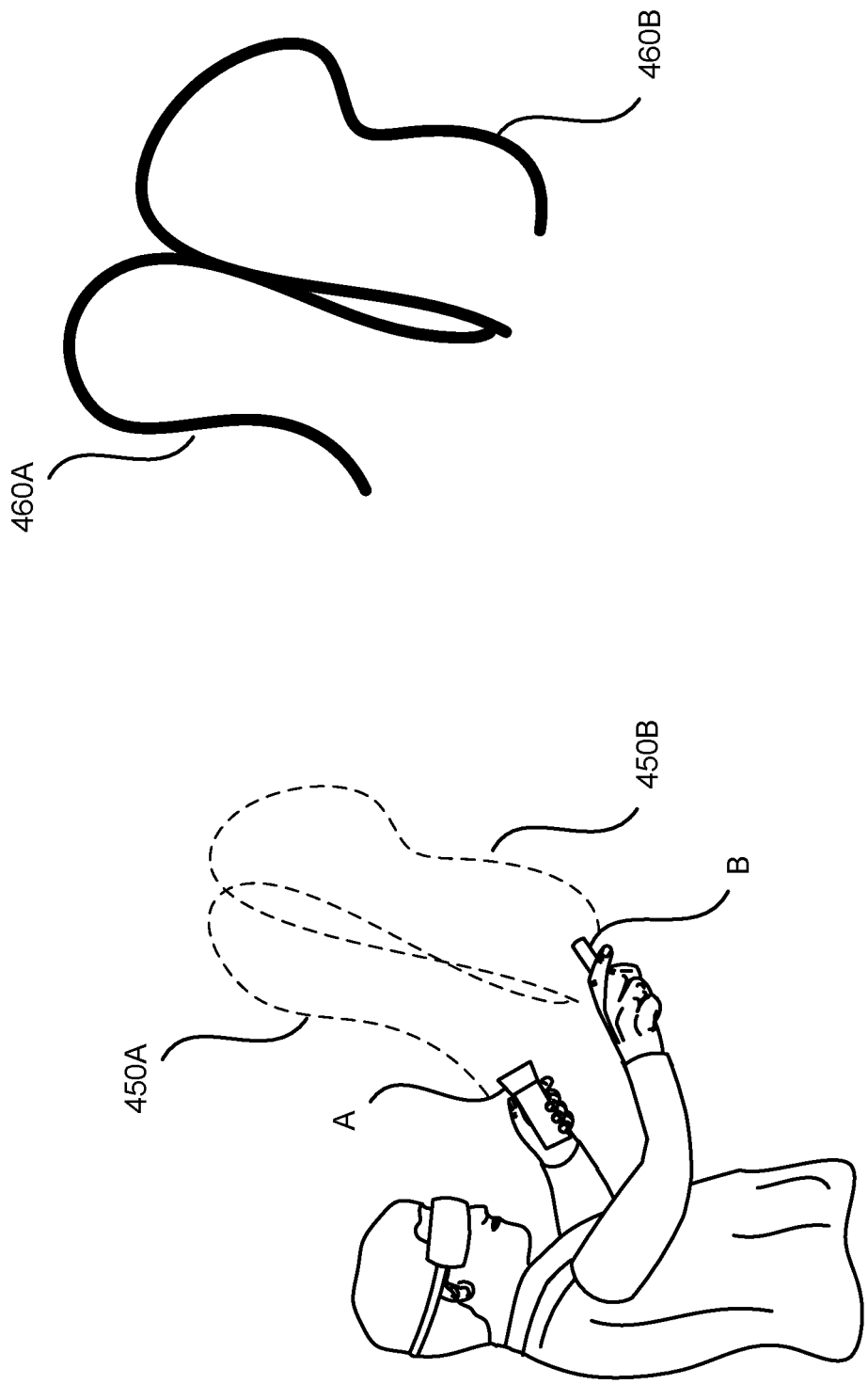

For example, as shown in FIG. 10D, a user using a drawing application in an augmented and/or virtual reality environment may move the first controller A in a sequential combination of movements, including numerous sequential rotational and translational movements, as shown by the track 450A, to generate a virtual pattern 460A displayed to the user in the virtual environment generated by the HMD 100. Similarly, the user may move the second controller B in a sequential combination of movements, including numerous sequential rotational and translational movements, as shown by the track 460B, to generate a virtual pattern 460B displayed to the user in the virtual environment generated by the HMD 100. In the example shown in FIG. 10D, as a single virtual object has not been selected specifically for interaction and/or manipulation by the user via the first and second controllers A, B. Thus, in this situation, movement of the controllers A, B may be tracked as described above, to generate the desired virtual effect, based on the detected movement about the respective, individual coordinate systems of the controllers A, B.

Figure 11A:
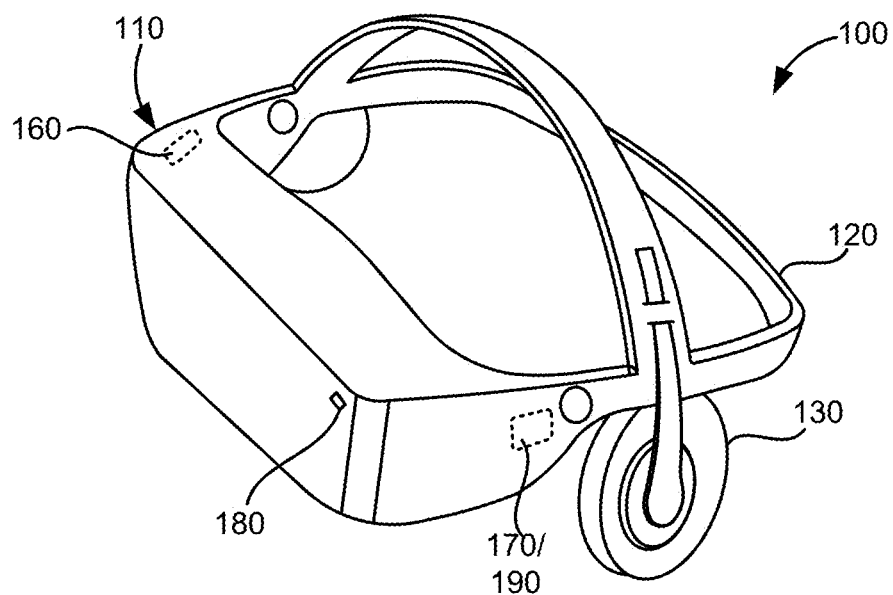
FIGS. 11A and 11B are perspective views of an example HMD, in accordance with implementations as described herein.
Figure 11B:
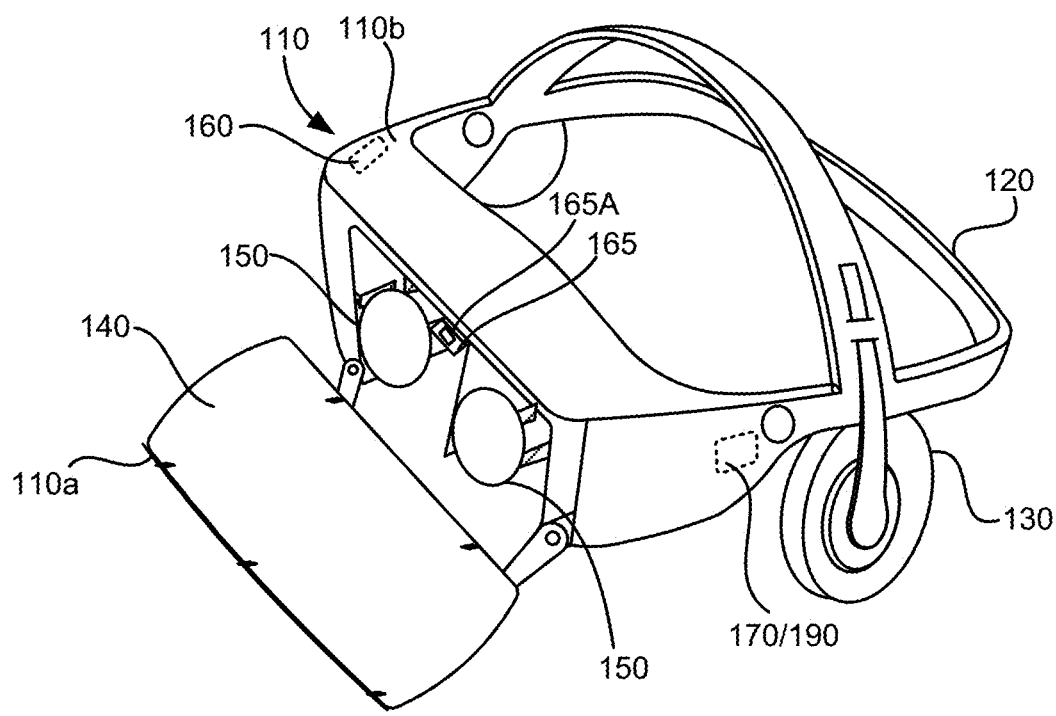
Figure 12:
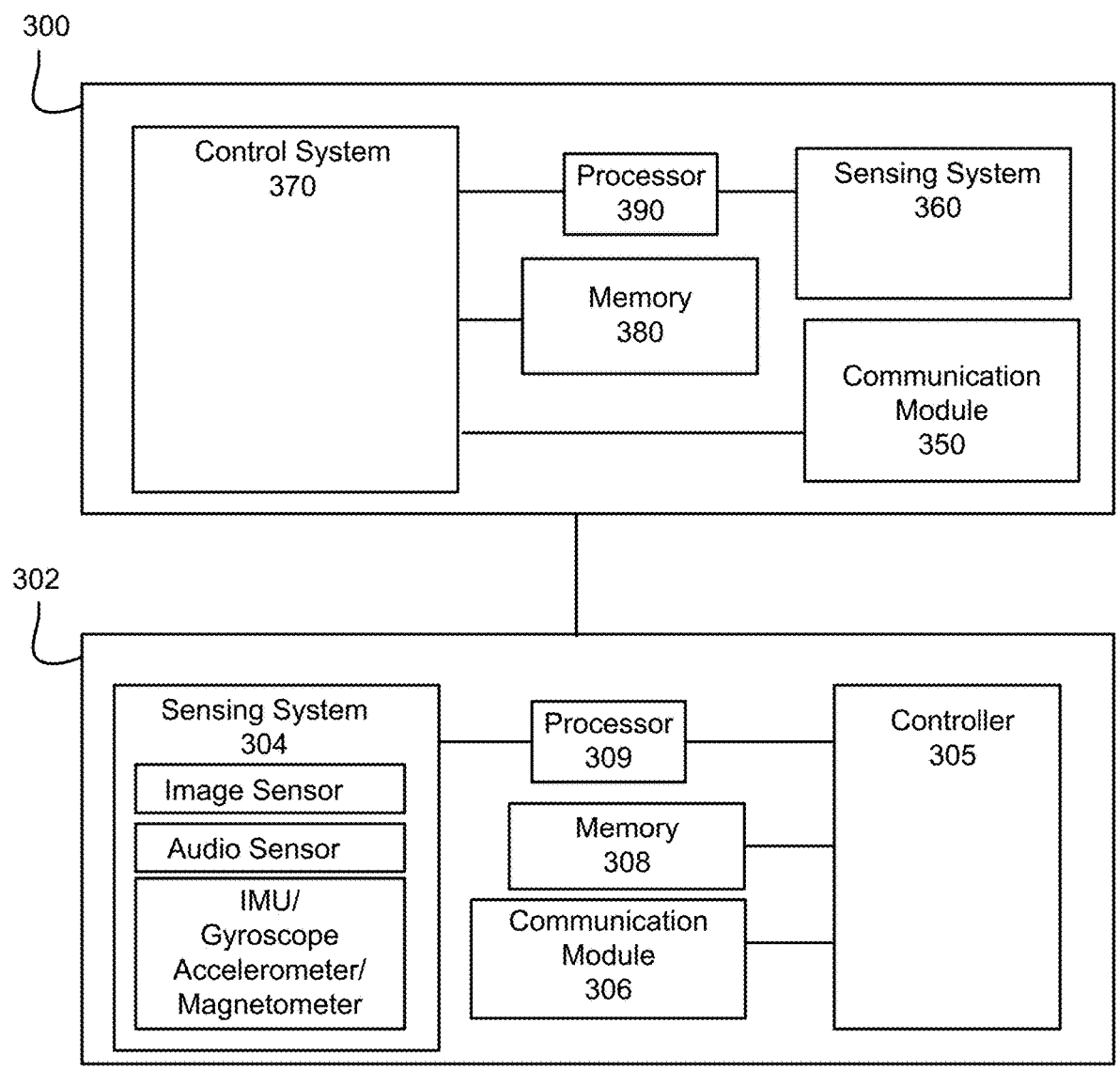
FIG. 12 is a block diagram of an augmented and/or virtual reality system, in accordance with implementations as described herein.

FIGS. 11A and 11B are perspective views of an example HMD, such as, for example, the HMD 100 worn by the user in FIGS. 1 and 10A. FIG. 12 is a block diagram of an augmented reality and/or virtual reality system including a first electronic device in communication with multiple different second electronic devices 302 including, for example, a first external device 302A and a second external device 302B. The first electronic device 300 may be, for example an HMD generating an augmented and/or virtual reality environment, and the second electronic devices 302 may be in communication with the first electronic device 300, and may be equipped to include the capabilities described above.

As shown in FIGS. 11A and 11B, the example HMD may include a housing 110 coupled to a frame 120, with an audio output device 130 including, for example, speakers mounted in headphones, coupled to the frame 120. In FIG. 11B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors such as, for example, audio sensor(s), image/light sensor(s), positional sensors (e.g., inertial measurement unit including gyroscope and accelerometer), and the like. The HMD 100 may also include a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the controller 102, and/or may be displayed to the user on the display 140 in a pass through mode. In some implementations, the HMD 100 may include a gaze tracking device 165 including one or more image sensors 165A to detect and track an eye gaze of the user. In some implementations, the HMD 100 may be configured so that the detected gaze is processed as a user input to be translated into a corresponding interaction in the augmented reality and/or virtual reality environment.

As shown in FIG. 12, the first electronic device 300 may include a sensing system 370 and a control system 380, which may be similar to the sensing system 160 and the control system 170, respectively, shown in FIGS. 10A and 10B. The sensing system 370 may include, for example, a light sensor, an audio sensor, an image sensor, a distance/proximity sensor, a positional sensor, and/or other sensors and/or different combination(s) of sensors, including, for example, an image sensor positioned to detect and track the user's eye gaze. The control system 380 may include, for example, a power/pause control device, audio and video control devices, an optical control device, a transition control device, and/or other such devices and/or different combination(s) of devices. The sensing system 370 and/or the control system 380 may include more, or fewer, devices, depending on a particular implementation, and may have a different physical arrangement that shown. The first electronic device 300 may also include a processor 390 in communication with the sensing system 370 and the control system 380, a memory 385, and a communication module 395 providing for communication between the first electronic device 300 and another, external device, such as, for example, the second electronic device 302.

The second electronic devices 302 (302A/302B) may include a communication module 306 providing for communication between each of the second electronic devices 302 and another device, such as, for example, the first electronic device 300. The second electronic devices 302 may each include a sensing system 304 including an image sensor and an audio sensor, such as is included in, for example, a camera and microphone, an inertial measurement unit, a touch sensor such as is included in a touch sensitive surface of a controller, or smartphone, and other such sensors and/or different combination(s) of sensors. A processor 309 may be in communication with the sensing system 304 and a control unit 305 of each of the second electronic devices 302, the control unit 305 having access to a memory 308 and controlling overall operation of each of the second electronic devices 302.

Figure 13:
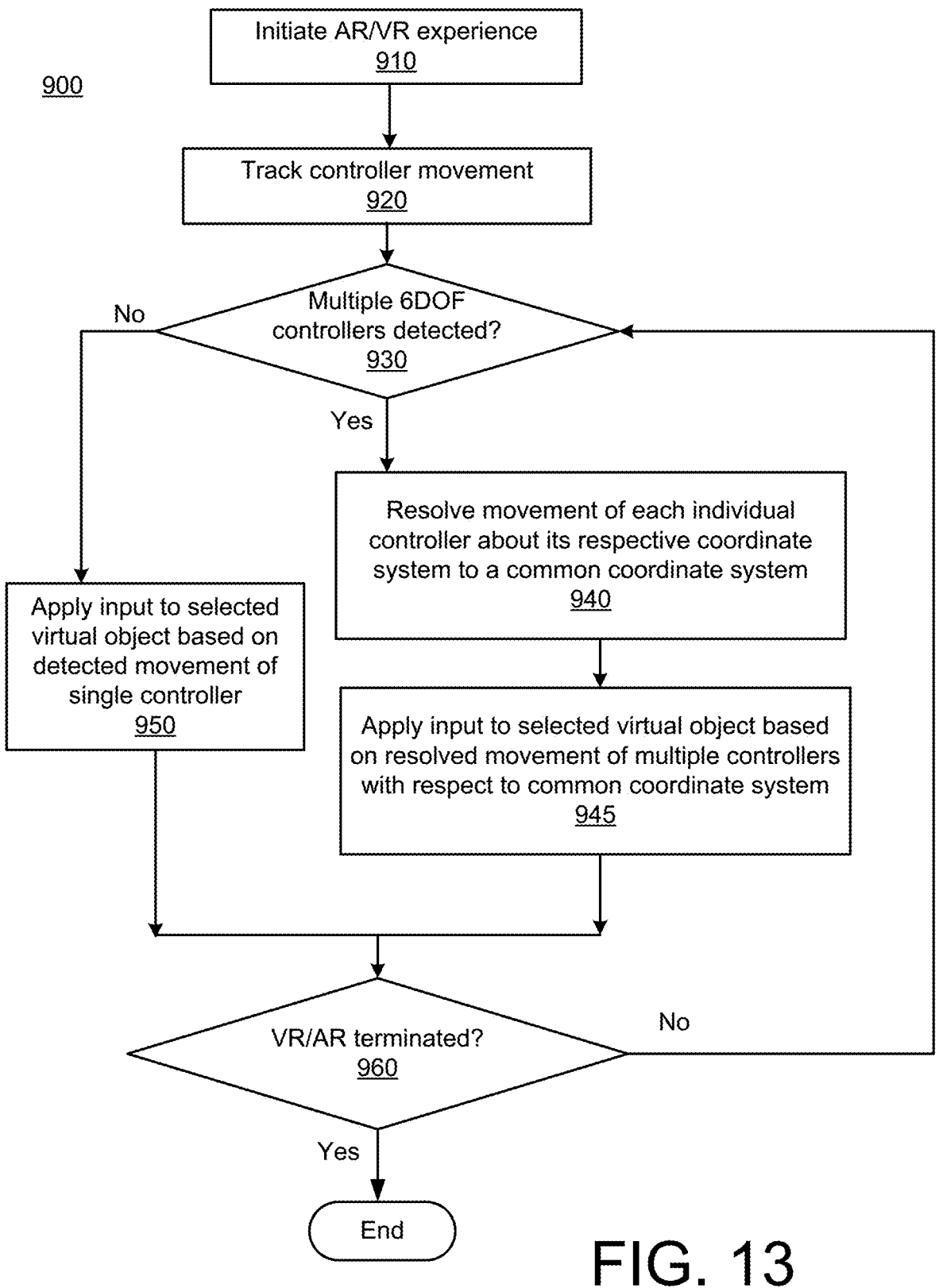
FIG. 13 is a flowchart of a method in accordance with implementations as described herein.

A method 900 of resolving rotational movement of multiple controllers to a common coordinate system, for input in an augmented and/or virtual reality environment, in accordance with implementations described herein, is shown in FIG. 13.

After initiating a virtual and/or augmented reality experience (block 910), controller movement, for example, movement of one or more 6DOF controllers detected in the virtual environment generated by the HMD 100 may be tracked as described above (block 920). If multiple controllers, for example, first and second controllers A and B as described above, are detected in the virtual environment, the detected movement of the multiple controllers may be dynamically tracked, and the detected movement of the multiple controllers resolved to a single, common coordinate system, as described above in detail with respect to FIGS. 2-10C (block 940). A corresponding input may then be applied to a selected virtual object, based on either the movement of the multiple controllers that has been resolved to the common coordinate system (block 945) or based on the detected movement of a single controller about its respective coordinate system (block 950). The process may continue until the virtual experience is terminated (block 960).

Figure 14:
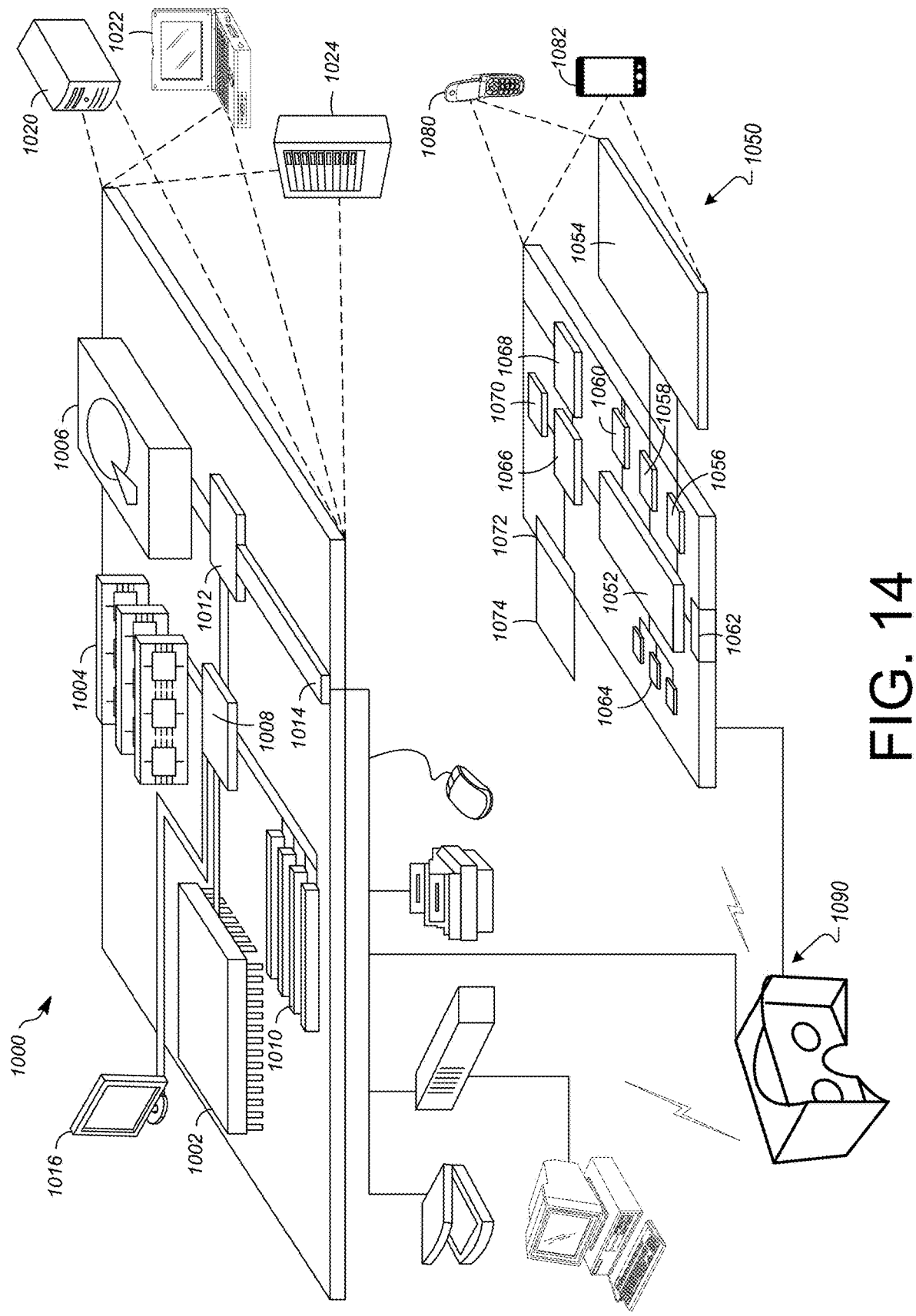
FIG. 14 shows an example of a computer device and a mobile computer device that can be used to implement the techniques described herein.

FIG. 14 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
generating a three-dimensional (3D) virtual environment;
tracking a six-degree-of-freedom (6DOF) position and orientation of a first controller in a physical environment;
tracking a 6DOF position and orientation of a second controller in the physical environment;
detecting a selection of a virtual object displayed in the virtual environment;
detecting an input targeted for the selected virtual object, including detecting a movement of the first controller and a movement of the second controller in the physical environment at the same point in time, the detected movement of the first controller being with respect to a first coordinate system and the detected movement of the second controller being with respect to a second coordinate system;
dynamically resolving the detected movement of the first controller with respect to the first coordinate system and the detected movement of the second controller with respect to the second coordinate system to a single 6DOF command movement with respect to a common coordinate system, including:
defining a first axis of the common coordinate system, the first axis extending from a central portion of the first controller to a central portion of the second controller;

defining a second axis of the common coordinate system, the second axis of the common coordinate system being selected from one of an X axis, a Y axis, or a Z axis of one of the first coordinate system or the second coordinate system that is most orthogonal to the first axis of the common coordinate system; and defining a third axis of the common coordinate system, the third axis of the common coordinate system being the cross product of the first axis of the common coordinate system and the second axis of the common coordinate system; and manipulating the selected virtual object in response to the single 6DOF command movement.

2. The method of claim 1, wherein defining the first axis includes dynamically defining the first axis of the common coordinate system as the first controller and the second controller move; and defining the second axis includes dynamically defining the second axis of the common coordinate system in response to detected continued movement of the first controller and the second controller; and defining the third axis includes dynamically defining the third axis of the common coordinate system, the third axis being the cross product of the dynamically defined first axis and the dynamically defined second axis.

3. The method of claim 2, wherein defining the first axis includes dynamically re-defining the first axis at sequential points in time in response to the continued movement of the first controller and the second controller.

4. The method of claim 3, wherein dynamically defining the second axis includes dynamically re-defining the second axis at sequential points in time, in response to the continued movement of the first controller and the second controller, and in response to the dynamic re-defining of the first axis.

5. The method of claim 4, wherein defining the third axis includes dynamically re-defining the third axis at sequential points in time in response to the continued movement of the first controller and the second controller, and in response to the dynamic re-defining of the first axis and the second axis.

6. The method of claim 2, wherein detecting the input targeted for the selected virtual object includes at least one of:

detecting a rotational movement of the first controller about at least one of the X axis, the Y axis or the Z axis of the first coordinate system; or detecting a rotational movement of the second controller about at least one of an X axis, a Y axis or a Z axis of the second coordinate system.

7. The method of claim 6, wherein dynamically resolving the detected movement of the first controller and the second controller to the single 6DOF command movement with respect to the common coordinate system includes:

determining a rotational command movement with respect to the common coordinate system based on at least one of the detected rotational movement of the first controller or the detected rotational movement of the second controller; and applying the rotational command movement to the manipulation of the selected virtual object.

8. The method of claim 2, wherein detecting the input targeted for the selected virtual object includes at least one of:

detecting a movement of the first controller with respect to at least one of the X axis, the Y axis or the Z axis of the first coordinate system, and with respect to a position of the second controller; or detecting a movement of the second controller with respect to at least one of an X axis, a Y axis or a Z axis of the second coordinate system, and with respect to a position of the first controller.

9. The method of claim 8, wherein dynamically resolving the detected movement of the first controller and the second controller to the single 6DOF command movement with respect to the common coordinate system includes:

determining a selected direction of movement and a selected amount of movement with respect to the common coordinate system based on at least one of the detected movement of the first controller or the detected movement of the second controller; and applying the selected amount of movement in the selected direction of movement to the manipulation of the selected virtual object.

10. The method of claim 1, wherein generating the 3D virtual environment includes displaying the virtual environment on a display of a head mounted display (HMD) device, the first and second controllers being handheld controllers that are operably coupled with the HMD, such that physical movement of the first and second controllers in the physical environment corresponds to user commands to be executed with respect to a selected virtual object displayed in the virtual environment.

11. The method of claim 1, wherein detecting the input targeted for the selected virtual object includes detecting simultaneous movement of the first controller and the second controller in the physical environment.

12. A method, comprising:

detecting a selection of a virtual object displayed in a virtual environment;

detecting an input targeted for the selected virtual object displayed in the virtual environment in response to a detected movement of a first controller and a detected movement of second controller in a physical environment at the same point in time, the detected movement of the first controller being with respect to a first coordinate system, and the detected movement of a second controller being with respect to a second coordinate system;

dynamically resolving the detected movement of the first controller with respect to the first coordinate system and the detected movement of the second controller with respect to the second coordinate system to a single 6DOF command movement with respect to a common coordinate system, including:

defining a first axis of the common coordinate system, the first axis of the common coordinate system extending from a central portion of the first controller to a central portion of the second controller; and dynamically defining a second axis of the common coordinate system, the second axis of the common coordinate system being selected from one of an X axis, a Y axis, or a Z axis of one of the first coordinate system or the second coordinate system that is most orthogonal to the first axis of the common coordinate system; and defining a third axis of the common coordinate system, the third axis of the common coordinate system being the cross product of the first axis of the common coordinate system and the second axis of the common coordinate system; and rotating the selected virtual object in the virtual environment in response to the single 6DOF command movement.

13. The method of claim 12, wherein
defining the first axis includes dynamically re-defining the first axis at sequential points in time in response to detected continued movement of at least one of the first controller or the second controller,
dynamically defining the second axis includes dynamically re-defining the second axis at sequential points in time in response to the detected continued movement of the at least one of the first controller or the second controller, and in response to the dynamic re-defining of the first axis, and
defining the third axis includes dynamically re-defining the third axis at sequential points in time in response to the detected continued movement of the at least one of the first controller or the second controller, and in response to the dynamic re-defining of the first axis and the second axis.

14. The method of claim 12, wherein detecting the input targeted for the selected virtual object includes at least one of:
detecting a rotational movement of the first controller about at least one of the X axis, the Y axis or the Z axis of the first coordinate system; or
detecting a rotational movement of the second controller about at least one of an X axis, a Y axis or a Z axis of the second coordinate system.

15. The method of claim 14, wherein dynamically resolving the detected movement of the first controller and the second controller to the single 6DOF command movement with respect to the common coordinate system includes:
determining a rotational command movement with respect to the common coordinate system based on at least one of the detected rotational movement of the first controller or the detected movement of the second controller; and
applying the rotational command movement to the manipulation of the selected virtual object.

16. The method of claim 12, further comprising:
tracking a six-degree-of-freedom (6DOF) position and orientation of the first controller in the physical environment;
tracking a 6DOF position and orientation of the second controller in the physical environment;
detecting the movement of the first controller based on the 6DOF tracking of the first controller; and
detecting the movement of the second controller based on the 6DOF tracking of the second controller.

17. The method of claim 12, wherein detecting the input targeted for the selected virtual object includes detecting simultaneous movement of the first controller and the second controller in the physical environment.

18. A computer program product embodied on a non-transitory computer readable medium, the computer readable medium having stored thereon a sequence of instructions which, when executed by a processor, causes the processor to execute a method, the method comprising:
generating a three-dimensional (3D) virtual environment;
tracking a six-degree-of-freedom (6DOF) position and orientation of a first controller in a physical environment;
tracking a 6DOF position and orientation of a second controller in the physical environment;
detecting a selection of a virtual object displayed in the virtual environment;
detecting an input targeted for the selected virtual object including detecting a movement of the first controller and the second controller in the physical environment at the same point in time, the detected movement of the first controller being with respect to a first coordinate system, and the detected movement of the second controller being with respect to a second coordinate system;
dynamically resolving the detected movement of the first controller with respect to the first coordinate system and the detected movement of the second controller with respect to the second coordinate system to a single 6DOF command movement with respect to a common coordinate system, including:
defining a first axis of the common coordinate system, the first axis of the common coordinate system extending from a central portion of the first controller to a central portion of the second controller; and
defining a second axis of the common coordinate system, the second axis of the common coordinate system being selected from one of an X axis, a Y axis, or a Z axis of one of the first coordinate system or the second coordinate system that is most orthogonal to the first axis of the common coordinate system; and
defining a third axis of the common coordinate system, the third axis of the common coordinate system being the cross product of the first axis and the second axis; and
manipulating the selected virtual object in response to the single 6DOF command movement.

19. The computer program product of claim 18, wherein detecting the input targeted for the selected virtual object in response to the detected movement of the first controller and the second controller includes at least one of:
detecting a rotational movement of the first controller about at least one of the X axis, the Y axis or the Z axis of the first coordinate system; or
detecting a rotational movement of the second controller about at least one of an X axis, a Y axis or a Z axis of the second coordinate system, and
wherein dynamically resolving the detected movement of the first controller and the second controller to the command movement with respect to the common coordinate system includes:
determining a rotational command movement with respect to the common coordinate system based on at least one of the detected rotational movement of the first controller or the detected movement of the second controller; and
applying the rotational command movement to the manipulation of the selected virtual object.

20. The computer program product of claim 18, wherein detecting the input targeted for the selected virtual object includes detecting simultaneous movement of the first controller and the second controller in the physical environment.

* * * * *